(12) United States Patent
Mulleris

(10) Patent No.: US 10,338,733 B2
(45) Date of Patent: Jul. 2, 2019

(54) INTERACTIVE TOUGH SYSTEM AND CONTROL TERMINAL

(71) Applicant: MERIM DIGITAL MEDIA, St Gaultier (FR)

(72) Inventor: Jean-Jacques Mulleris, Neuilly sur Seine (FR)

(73) Assignee: MERIM DIGITAL MEDIA, St Gaultier (FR)

( * ) Notice: Subject to any disclaimer, the term of this patent is extended or adjusted under 35 U.S.C. 154(b) by 62 days.

(21) Appl. No.: 15/546,437

(22) PCT Filed: Jan. 27, 2016

(86) PCT No.: PCT/EP2016/051650
§ 371 (c)(1),
(2) Date: Jul. 26, 2017

(87) PCT Pub. No.: WO2016/120304
PCT Pub. Date: Aug. 4, 2016

(65) Prior Publication Data
US 2018/0275813 A1  Sep. 27, 2018

(30) Foreign Application Priority Data
Jan. 27, 2015  (FR) ..................... 15 50632

(51) Int. Cl.
*G06F 3/041* (2006.01)
*G06Q 20/18* (2012.01)
(Continued)

(52) U.S. Cl.
CPC ........ *G06F 3/0416* (2013.01); *G06F 3/03547* (2013.01); *G06K 7/1413* (2013.01); *G06Q 20/18* (2013.01); *G07F 9/023* (2013.01)

(58) Field of Classification Search
CPC . G06F 3/0416; G06F 3/03547; G06K 7/1413; G07F 9/023; G06Q 20/18
See application file for complete search history.

(56) References Cited

U.S. PATENT DOCUMENTS 5,636,101 A   6/1997  Bonsall et al.
6,688,518 B1  2/2004  Valencia et al.
(Continued)

OTHER PUBLICATIONS

International Search Report for corresponding International PCT Application No. PCT/EP2016/051650.

*Primary Examiner* — Ibrahim A Khan
(74) *Attorney, Agent, or Firm* — Hauptman Ham, LLP

(57) ABSTRACT

An interactive touch system comprising: a touchpad, an electronic assembly linked electronically to the touchpad and comprising communication means able to receive data to be displayed on a screen of the touchpad and program updates, a card for converting control signals of the touchpad, linked to the touchpad, being linked to an electrical generator and also linked and driven by the electronic assembly, an electronic card able to control the lighting up of the back lighting system, being linked to the electrical generator and also linked and driven by the electronic assembly, a touch controller linked to the touchpad connected to the electronic assembly. The electronic system, the control card for the lighting up of the backlighting system, the card for converting the video signals and the touch controller are incorporated in the back of said touchpad and are linked by an action facility.

20 Claims, 4 Drawing Sheets

Figure 1:
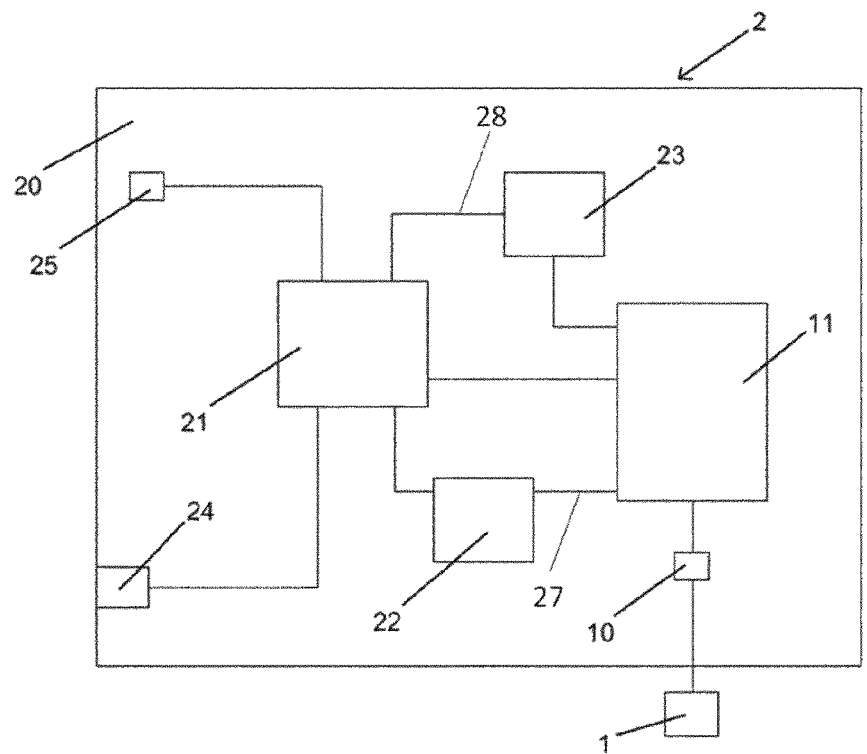

(51) Int. Cl.
  *G06F 3/0354* (2013.01)
  *G07F 9/02* (2006.01)
  *G06K 7/14* (2006.01)

(56) References Cited

U.S. PATENT DOCUMENTS

| | | | | |
|---|---|---|---|---|
| 7,366,586 B2* | 4/2008 | Kaplan | ............ | G06Q 10/06311 |
| | | | | 700/241 |
| 7,546,957 B2* | 6/2009 | Melnik | ................. | G06Q 10/02 |
| | | | | 235/380 |
| 7,565,353 B2* | 7/2009 | Gatto | .................... | G06Q 20/18 |
| 8,346,610 B2* | 1/2013 | Mennie | ................. | G06K 9/033 |
| | | | | 705/16 |
| 10,062,064 B2* | 8/2018 | Glass | ................. | G06Q 20/354 |
| 10,089,614 B1* | 10/2018 | Catoe | ........................ | G07G 1/01 |
| 2003/0038835 A1* | 2/2003 | DeFelice | ................. | G06F 1/181 |
| | | | | 715/738 |
| 2004/0140350 A1 | 7/2004 | Valencia et al. | | |
| 2005/0220675 A1* | 10/2005 | Reed | .................... | B01L 3/5025 |
| | | | | 422/400 |
| 2006/0102413 A1* | 5/2006 | Ootani | ................ | B60R 21/0136 |
| | | | | 180/274 |
| 2009/0113116 A1* | 4/2009 | Thompson | ............ | G06F 13/385 |
| | | | | 711/103 |
| 2010/0217892 A1* | 8/2010 | Silva | .................... | G06F 9/4413 |
| | | | | 710/5 |
| 2011/0122995 A1* | 5/2011 | Ferro, Jr. | ............. | A61B 6/4429 |
| | | | | 378/62 |
| 2011/0220544 A1* | 9/2011 | De Alba | ............... | B65D 19/385 |
| | | | | 206/600 |
| 2011/0234514 A1* | 9/2011 | Gothard | ................. | G06Q 30/02 |
| | | | | 345/173 |
| 2012/0248814 A1* | 10/2012 | Tsukiyama | ............... | B60J 5/101 |
| | | | | 296/146.8 |
| 2013/0135665 A1* | 5/2013 | Griffith | ................... | G06F 3/122 |
| | | | | 358/1.15 |
| 2013/0191236 A1* | 7/2013 | Bowles | ................. | G06Q 10/30 |
| | | | | 705/26.3 |
| 2013/0193213 A1* | 8/2013 | Hirono | ............... | G06K 7/10851 |
| | | | | 235/462.26 |
| 2014/0019177 A1* | 1/2014 | Smith | ................... | G06Q 10/025 |
| | | | | 705/6 |
| 2014/0374485 A1* | 12/2014 | Xian | .................. | G06K 7/10603 |
| | | | | 235/462.22 |
| 2016/0098688 A1* | 4/2016 | Hunt | ..................... | G06Q 20/18 |
| | | | | 705/308 |

* cited by examiner

INTERACTIVE TOUGH SYSTEM AND CONTROL TERMINAL

TECHNICAL SCOPE OF THE INVENTION

The present invention relates to the field of man/machine interaction systems. More particularly, the invention relates to an interactive touch system and a control and payment terminal.

TECHNOLOGICAL BACKGROUND OF THE INVENTION

Control terminals comprising a man/machine interface letting users interact, most times via a touch screen, with the terminal in question are known from the prior art. These terminals are designed to enable and automate commands created by users, for example for travel tickets or food. The data displayed on the screen of the touch pad are selections of menus and comprise interactive elements for selecting and calling up a menu. Many restaurants and transport firms are equipped with this type of command terminal. However, producing such terminals is complicated and delicate. Terminals comprise many items of equipment, such as barcode scanners, printers, keypads, card readers, all functioning at different voltages and power levels. But there are also touch pads which are connected to a controller for video signals (CSV), to a touch controller (CT) and to a controller of the backlighting system (CRSE). Only for the touch pad, this needs a certain number of cablings which have to be supplied into the housing of the terminal. This creates a cabling which is highly complex, cumbersome and bulky to put in place and upkeep. The aim of the invention is to reduce the number of cables present in the terminal and to limit cabling problems.

The object of the present invention therefore is to propose a control terminal which eliminates at least some of the disadvantages of the prior art, by streamlining the cabling and separating the signals coming from the terminal electronics.

For this purpose, the invention relates to an interactive touch system comprising:
  a touch pad, comprising a hard protective surface stuck to the touch screen of the pad,
  an electronic assembly, connected electronically to the touch pad, ensuring at least the provision of command and control signals of the pad and the data to be displayed on the screen of the pad, the electronic assembly comprising communications means capable of receiving the data to be displayed on the screen and program updates,
  a conversion card for control signals of the touch pad, connected to the touch pad, being connected to the electric generator and also connected to and controlled by the electronic assembly, being capable of ensuring the conversion of control signals originating from the electronic assembly into video signals for the screen of the corresponding touch pad,
  an electronic card capable of controlling the lighting of the backlighting system, being connected to the electric generator and also connected to and controlled by the electronic assembly,
  a touch controller connected to the touch pad is connected to the electronic assembly, enabling conversion of the signal, generated by the pad after the screen has been touched, into an electric signal which can be interpreted by the electronic assembly, characterized in that:
  said electronic system, said control card of the lighting of the backlighting system, said conversion card of video signals and said touch controller are incorporated into the back of said touch pad and connected by connectors.

According to another particular feature, an electric generator capable of supplying directly, according to predefined voltages and power, at least the electronic assembly connected to the touch pad is incorporated into the back of the touch pad.

According to another particular feature, the electric generator is a power supply connected to the sector, this supply comprising a plurality of outputs whereof the power, voltage and intensity are variable as a function of the output in question, so as to be able to directly supply all equipment contained in the interactive system.

According to another particular feature, the electronic assembly of the interactive system is connected to complementary equipment including a barcode reader module, a printer, a payment system comprising a bank card reader, a loudspeaker and input means and provides the supply voltages for all or some of this complementary equipment.

According to another particular feature, the electronic assembly comprises a motherboard connected to an output of the power supply, said motherboard comprises a plurality of inlet/outlet plugs, for connecting the different elements of the interactive touch system and of the control terminal.

According to another particular feature, the interactive touch system comprises a barcode reader comprising a viewing window having received antireflective treatment on each of its faces.

According to another particular feature, the interactive touch system comprises a barcode reader comprising an infrared detection sensor, connected to the control card of the scanner and supplied by the latter for detecting the presence of an object placed in front of the viewing window of the reader.

According to another particular feature, the electronic assembly comprises a supply interrupter.

According to another particular feature, the backlighting system comprises a plurality of light-emitting diodes, the supply of the diodes being controlled by the electronic assembly.

The invention also relates to a control terminal comprising:
  a caisson comprising at least one door equipped with a closing device, the door further comprising a plurality of openings and pivotably mounted on a frame comprising an X-shaped central reinforcement,
  at least one interactive touch system according to claims 1 to 9, the hard protective surface stuck to the touch screen of each pad projecting onto the pad and having a thickness adapted to fall into an opening flush with the external surface of the caisson, the electronic assembly of the corresponding pad being incorporated into the back of said touch pad, the supplies for the other equipment passing into the reinforcement bars of the caisson,
  complementary equipment including a barcode reader module, a printer, a payment system comprising a bank card reader, a loudspeaker and input means, incorporated into the openings of the door, being controlled by at least one electronic assembly and supplied by the electronic assembly or the electric generator of the corresponding interactive touch system.

According to another particular feature, the terminal comprises two interactive touch systems arranged back to back, each pad being controlled by its own electronic assembly, each electronic assembly being connected to a plurality of complementary items of equipment contained in the interactive systems, each element of the terminal also being connected to only a single electronic assembly, the two electronic assemblies of the terminal being independent.

According to another particular feature, the closing system of the caisson is controlled by an electronic card supplied by a supplementary power supply contained in the terminal.

According to another particular feature, each electronic assembly of the terminal is connected to complementary equipment including a barcode reader module, a printer, and a payment system comprising a bank card reader, a loudspeaker and input means.

According to another particular feature, the terminal comprises at least one temperature probe and at least one fan connected on the one hand to the electronic control card for closing the caisson and on the other hand to the supplementary supply of the terminal, with powering up of the fan being controlled by the electronic card when the internal temperature of the terminal detected by the temperature sensor exceeds a threshold value recorded in a memory space of the electronic card.

Figure 2:
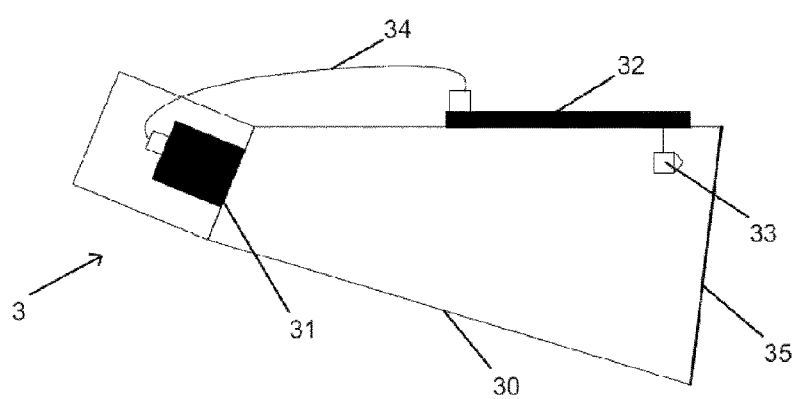
Figure 3:
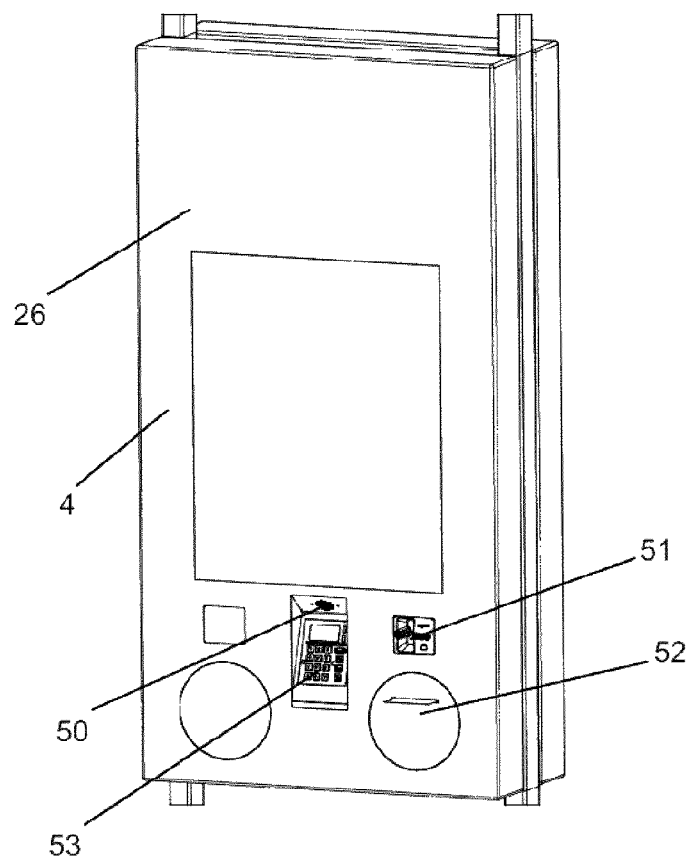
Figure 4:
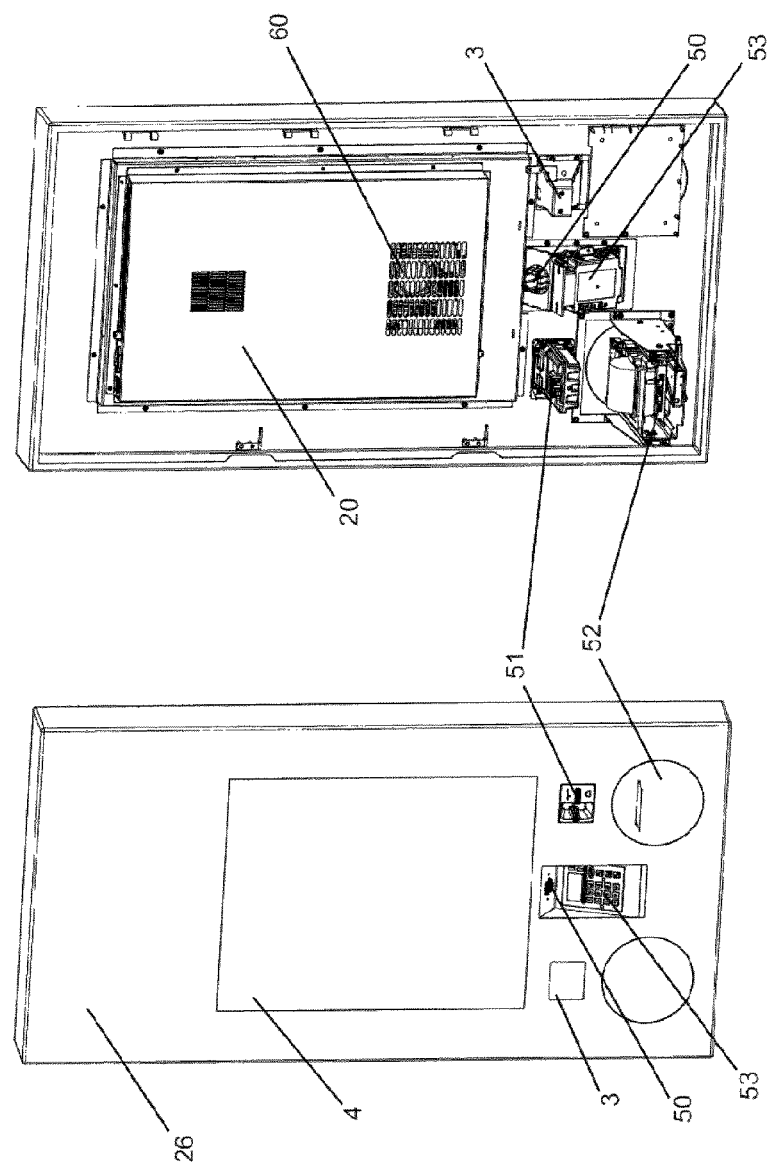
Figure 5:
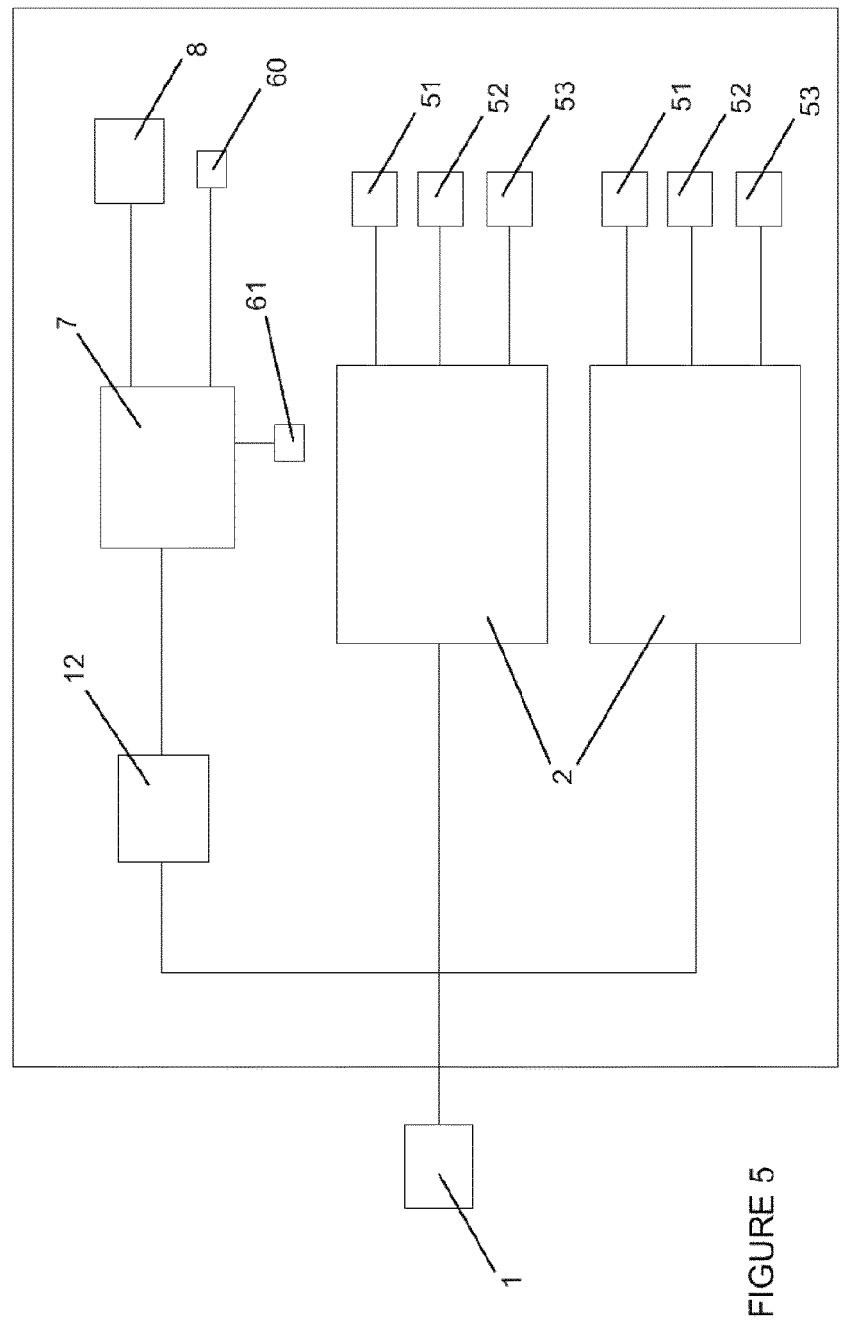

The invention, with its characteristics and advantages, will emerge more clearly from the description given in reference to the appended drawings, in which:

FIG. 1 illustrates a synoptic diagram of the electronic assembly of an interactive touch system in an embodiment, FIG. 2 illustrates a synoptic diagram in section of a barcode reader according to an embodiment, FIG. 3 illustrates a perspective view of a control terminal in an embodiment, FIG. 4 illustrates a perspective view of an open terminal comprising two interactive touch systems revealing the external face of an interactive system and the internal face of the other interactive system, FIG. 5 illustrates a synoptic diagram of the electronic assembly of the control terminal in an embodiment.

DESCRIPTION OF PREFERRED
EMBODIMENTS OF THE INVENTION

The invention will now be described in reference to FIGS. 1 to 5.

In an embodiment, the control terminal according to the invention comprises a caisson (4), this caisson comprising a closing device (8).

By way of non-limiting example, this closing device (8) can be a system of electronic strike which controls at least the opening and closing of the doors of the caisson. In an embodiment, the closing system (8) of the caisson (4) is controlled by an electronic card (7) supplied by a supplementary power supply (12) contained in the terminal and advantageously autonomous of the supply of the interactive touch system (2).

This caisson, which is the covering of the terminal, integrates in its interior all the elements forming the control terminal. In an embodiment, the terminal comprises a plurality of openings, for example and non-limiting machined into at least one of the faces of the caisson, so that the user has access to at least some of the elements comprising the control terminal. In an embodiment, the caisson comprises in its interior a plurality of reinforcement bars, for example and non-limiting made of steel, on which are incorporated the different elements contained in the control terminal according to the invention.

In an embodiment, the control terminal comprises at least one interactive touch system (2), this system being the man/machine interface of the control terminal. This interactive touch system will now be described.

In an embodiment, the interactive touch system (2) comprises a touch screen (20) on which is stuck a hard protective surface (26), for example and non-limiting made of tempered glass. In a preferred embodiment, this hard surface is projecting. Thus, when the interactive touch system (2) is mounted in the control terminal, this hard surface projecting from the touch pad falls flush with the caisson (4) of the control terminal. In an embodiment, the interactive touch system (2) comprises an electronic assembly (21) at least capable of controlling the supply of the backlighting system of the touch pad (20), and of controlling the display of the touch pad via control signals, for example video signals. In an embodiment, this electronic assembly is incorporated into the back of the touch pad (20) near the reinforcement bars of the control terminal.

In an embodiment, the interactive touch system comprises an electric generator (1, 11) capable of supplying at least the electronic assembly (21) connected to the touch pad, the generator further comprising a plurality of outputs at predefined voltages, intensities and power levels. In an embodiment and preferably, the electronic assembly comprises a supply interrupter (25), for example an on/off button for controlling the arrival of electric power in the electronic assembly.

In an embodiment, the electronic assembly (21) and the electric generator (1, 11) of the interactive system (2) will now be described more precisely.

In an embodiment, the electric generator comprises a power supply (11) directly connected to the sector (1). A filter (10), for example a "Schaffner" filter, is preferably arranged between the sector and the power supply. This power supply (11) comprises a plurality of output having different voltages, intensities and power levels, as a function of the type of equipment to be supplied. For example and non-limiting, the voltages available from the outputs of the supply are 5V, 12V and 24V. Throughout the description, the expression "power supply" will be used to refer to the electric generator, for greater convenience.

The electronic assembly (21) according to the invention comprises a motherboard connected to an output of the power supply, itself comprising at least one processor and at least one memory space, for example a hard drive. The motherboard comprises a plurality of inlet/outlet plugs, for example and non-limiting in RS 232, or RS 422, or RS 485 or USB format, for connecting the different elements of the interactive touch system and of the control terminal.

In an embodiment, a touch controller (24) connected to the touch pad (20) is connected, via a plug provided for this purpose, to the motherboard of the electronic assembly. This touch controller, well known to those skilled in the art, enables conversion of the signal, generated by the pad after the screen has been touched, into an electric signal which can be interpreted by the motherboard of the electronic assembly.

In an embodiment, the motherboard of the electronic assembly (21) is connected to an electronic control card (23) of the backlighting system of the touch pad. This electronic control card of the backlighting system, contained in the touch pad, is connected directly to an output of the power supply (11). The connection between the electronic assembly, the electronic control card of the backlighting system and the power supply is made in a preferred mode by way of a Y cable (28). This electronic card (23) is also connected to and controlled by the motherboard of the electronic assembly (21), which finally controls the powering up or powering down of the backlighting system of the touch pad (20). For example and non-limiting, the backlighting system of the touch pad (20) comprises a plurality of light-emitting diodes. The backlighting system is directly connected to the power supply, for example and non-limiting via a 24V output.

In an embodiment, the motherboard of the electronic assembly (21) is connected to an electronic control card (22) of video signals for the touch pad. This electronic control card (22) of video signals, contained in the touch pad (20), is directly connected to an output of the power supply (11). The connection between the electronic assembly, the electronic control card of the video system and the power supply is made in a preferred mode by way of a Y cable (27). This electronic card (22) is also connected to and controlled by the motherboard of the electronic assembly (21), and ensures conversion of control signals originating from the motherboard of the electronic assembly into video signals for the touch pad (20) to enable display of information for users.

The motherboard of the electronic assembly comprises communications means such as Bluetooth or Wi-Fi for receiving data to be displayed on the screen and/or program updates managing the operation of the interactive touch system.

In an embodiment, the interactive touch system (2) comprises a plurality of electric and/or complementary electronic items of equipment, arranged on the reinforcement bars of the caisson of the control terminal. This complementary equipment is all connected to the motherboard of the electronic assembly (21), said assembly being capable of controlling each of these complementary items of equipment. On the other hand and in a preferred embodiment, each complementary element is directly connected to an output of the power supply (11) so as to be supplied directly with electricity at voltages, intensity and power compatible with each complementary element. In an alternative embodiment, it is the motherboard of the electronic assembly (21) which provides the power needed for operation of the complementary equipment connected to the latter. In another alternative mode, the complementary equipment is either supplied by the electronic assembly (21) or in some cases connected directly to the centralized supply (11).

In this way, the electronic assembly communicates via communication means and generates supplies for the complementary equipment.

In an embodiment, of this complementary equipment, the interactive touch system comprises a barcode reader module (3), installed to allow reading of barcodes, for example and non-limiting on loyalty cards, discount vouchers, or different barcodes displayable on nomadic systems (mobile phones, touch pads) of users of the interactive system.

In an embodiment, the barcode reader module (3) comprises a casing (30) whereof one face is a viewing window (35) to allow reading of barcodes, a casing in which is incorporated a scanner (31) fitted for example with a decoding card and an image sensor for reading barcodes, this scanner being connected via a ribbon cable (34) to a control card (32) contained in the casing of the reader. In an embodiment, the scanner (31) is connected to the motherboard of the electronic assembly (21), via a Universal Serial Bus interface (USB), whereas the control card is connected to the scanner (31) at an output of the power supply (11), for example a 5V output. In this embodiment, the scanner (31) therefore supplies the control card (32) of the scanner. In an alternative embodiment, the control card (32) is supplied by the electronic assembly (21) for example via a USB interface. In this embodiment, it is the control card which supplies the scanner of the barcode reader. In an embodiment, the reader also comprises a detection sensor (33), for example an infrared sensor, connected to the control card (32) of the scanner and supplied by the latter, detects the presence of an object placed in front of the viewing window of the reader. Thus, when an object is detected in front of the viewing window (35), the detection sensor sends a signal to the control card which controls powering up of its scanner. The scanner makes a reading and, by way of the image sensor, records the data which are sent via the two above-mentioned modes through the ribbon cable to the control card which, if the read object includes a code whereof the structure is that of a barcode, for example a classic barcode or a two-dimensional barcode, in turn sends these data to the motherboard of the electronic assembly or directly via the USB interface of the scanner if the read object includes a code whereof the structure is that of a barcode, for example a classic barcode or a two-dimensional barcode, these data being sent to the motherboard of the electronic assembly. The motherboard of the electronic assembly (21) then associates the data originating from the reading by the barcode reader (3) with an element present in at least one database recorded in a memory space of the electronic assembly. For example and non-limiting, a barcode can be associated with a personalised loyalty card, a pre-ordered travel ticket, a discount voucher.

In a preferred embodiment, the viewing window (35) of the barcode reader has received antireflective treatment on both faces to enable detection and reading of barcodes.

In an embodiment, of this complementary equipment, the interactive touch system comprises a payment system for letting users make transactions via the control terminal comprising at least one interactive touch system.

In an embodiment, the payment system comprises a bank card reader (51) and input means (53), for example an alphanumeric keypad. In an embodiment, the payment system also comprises a loudspeaker (50), connected to the motherboard of the electronic assembly via an audio plug. The loudspeaker is preferably supplied directly by the internal audio amplifier of the motherboard of the electronic assembly (21). In another embodiment, the loudspeaker is directly connected to the external audio outputs of the motherboard of the electronic assembly (21).

In an embodiment, the bank card reader (51) is connected to the input means (53), which is in turn connected on the one hand to the power supply (11), for example via a 12V output, and on the other hand to the motherboard of the electronic assembly (21). In this way, it is the input means which supply the card reader. In another embodiment, the bank card reader (51) is connected to the input means (53), which is in turn connected to an RS 232 output supplied by a 12V output of the motherboard of the electronic assembly (21). In this way, it is the input means which supply the card reader.

In an embodiment, among this complementary equipment, the interactive touch system comprises a printer (52) connected to the motherboard of the electronic assembly (21), the printer being supplied directly by the supply (11), for example via a 24V output. This printer enables printing of tickets describing the result of the interaction between a user and the interactive touch system (2) of the terminal, for example and non-limiting, cash register receipts.

In an embodiment, the control terminal according to the invention comprises two interactive touch systems (2) arranged back to back. Because each interactive system is controlled by its own electronic assembly (21), the two interactive systems are consequently fully independent. This means that two users can interact with the terminal at the same time, independently. In the same way, each interactive touch system (2) of the terminal comprises its own complementary equipment connected to the electronic assembly of the corresponding interactive system, and therefore each complementary item of equipment of the terminal is connected to a single electronic assembly (21).

In an embodiment, the closing system of the caisson (8) of the terminal is controlled by an electronic card (7) supplied directly by a supplementary power supply (12) contained in the terminal and for example connected to the sector (1), the voltage output of this supplementary supply being for example and non-limiting 12V. In an embodiment, the closing system of the caisson can be controlled manually for example by means of a mechanical key, for example in case of electric and/or electronic failure.

In an embodiment, the closing system (8) comprises at least one electronic key detector connected to the electronic card (7) controlling the closing or opening of the caisson (4). In fact, when a user is holding an electronic key, the detector detects the corresponding key and sends the detection signal to the electronic card (7) which then controls opening of the caisson (4).

In an embodiment, the control terminal comprises at least one temperature probe (61) and a fan (60), both connected to the electronic control card (7) for closing the caisson (4) of the terminal. Also, the probe and the fan are directly connected to the supplementary supply (12) of the terminal. In an embodiment, when the temperature inside the control terminal exceeds a certain value recorded in a memory zone of the electronic card (7) controlling closing of the caisson, said electronic card controls the powering up of the fan (61) to trigger circulation of air in the control terminal, enabling cooling of the air inside the caisson.

The present application describes various technical characteristics and advantages in reference to the figures and/or various embodiments. Those skilled in the art will understand that the technical characteristics of a given embodiment can in fact be combined with characteristics of another embodiment unless otherwise expressed or it is not evident that these characteristics are incompatible. Also, the technical characteristics described in a given embodiment can be isolated from the other characteristics of this mode unless otherwise expressed.

It must be evident for those skilled in the art that the present invention enables embodiments in many other specific forms without departing from the field defined by the scope of the appended claims, and the invention does not have to be limited to the details given hereinabove.

The invention claimed is:

1. A control terminal comprising:
a caisson comprising at least one door equipped with a closing device, the door further comprising a plurality of openings and pivotably mounted on a frame;
at least one interactive touch system, each interactive touch system comprising:
a touch pad, comprising a hard protective surface stuck to the touch screen of the pad projecting onto the pad and having a thickness adapted to fall into an opening flush with the external surface of the caisson, an electronic assembly of the corresponding pad being incorporated into the back of said touch pad, the supplies for the other equipment passing into the reinforcement bars of the caisson;
the electronic assembly, connected electronically to the touch pad, ensuring at least the provision of command and control signals of the pad and the data to be displayed on the screen of the pad, said electronic assembly comprising a network connection configured to receive the data to be displayed on the screen and program updates;
a conversion card for control signals of the touch pad, connected to the touch pad, being connected to an electric generator and also connected to and controlled by the electronic assembly, being configured to ensure the conversion of control signals originating from the electronic assembly, into video signals for the screen of the corresponding touch pad;
an electronic card configured to control the lighting of the backlighting system, being connected to the electric generator and also connected to and controlled by the electronic assembly; and
a touch controller connected to the touch pad is connected to the electronic assembly, enabling conversion of the signal, generated by the pad after the screen has been touched, into an electric signal which can be interpreted by the electronic assembly; and
complementary equipment including at least one of a barcode reader module, a printer, a payment system, the payment system comprising a bank card reader and an input, said complementary equipment being connected and controlled by at least one said electronic assembly and supplied by the electronic assembly or a power supply of the corresponding interactive touch system,
wherein
said electronic assembly, said electronic card of the lighting of the backlighting system, said conversion card of video signals and said touch controller are incorporated into the back of said touch pad and connected by connectors, and
wherein said interactive touch system and said complementary equipment are incorporated into the openings of the door.

2. The control terminal according to claim 1, wherein an electric generator configured to supply directly, according to predefined voltages and power, at least the electronic assembly connected to the touch pad is incorporated into the back of the touch pad.

3. The control terminal according to claim 1, wherein the electric generator is a power supply connected to a sector, this supply comprising a plurality of outputs whereof the power, voltage and intensity are variable as a function of the output in question, so as to be able to directly supply all equipment contained in the interactive system.

4. The control terminal according to claim 1, wherein the electronic assembly of the interactive system is connected to complementary equipment including a barcode reader module, a printer, a payment system comprising a bank card reader, a loudspeaker and the input and provides the supply voltages for all or some of this complementary equipment.

5. The control terminal according to claim 1, wherein the electronic assembly comprises a motherboard connected to an output of the power supply, said motherboard comprises a plurality of inlet/outlet plugs, for connecting the different elements of the interactive touch system and of the control terminal.

6. The control terminal according to claim 1, comprising a barcode reader comprising a viewing window having received antireflective treatment on each of its faces.

7. The control terminal according to claim 1, comprising a barcode reader comprising an infrared detection sensor, connected to the electronic card of the scanner and supplied by the latter for detecting the presence of an object placed in front of the viewing window of the reader.

8. The control terminal according to claim 1, wherein the electronic assembly comprises a supply interrupter.

9. The control terminal according to claim 1, wherein the backlighting system comprises a plurality of light-emitting diodes, the supply of the diodes being controlled by the electronic assembly.

10. The control terminal of claim 1 wherein the caisson comprises in its interior a plurality of reinforcement bars on which are incorporated the different elements contained in the control terminal.

11. The control terminal of claim 1 wherein the payment system also comprises a loudspeaker connected to the motherboard of the electronic assembly via an audio plug.

12. The control terminal of claim 1 wherein the barcode reader module comprises a casing whereof one face is a viewing window to allow reading of barcodes, a casing in which is incorporated a scanner fitted, this scanner being connected via a ribbon cable to an electronic card contained in the casing of the reader.

13. The control terminal of claim 12 wherein the barcode reader module also comprises a detection sensor connected to the electronic card of the scanner and supplied by the latter, said detection sensor configured to:
  detect the presence of an object placed in front of the viewing window of the reader; and
  send a signal to the electronic card which controls powering up of the scanner.

14. The control terminal of claim 12 wherein the viewing window of the barcode reader has received antireflective treatment on both faces to enable detection and reading of barcodes.

15. A control terminal comprising:
  a caisson comprising at least one door equipped with a closing device, the door further comprising a plurality of openings and pivotably mounted on a frame comprising an X-shaped central reinforcement,
  at least one interactive touch system, each interactive touch system comprising:
  a touch pad, comprising a hard protective surface, the hard protective surface stuck to the touch screen of each pad projecting onto the pad and having a thickness adapted to fall into an opening flush with the external surface of the caisson, an electronic assembly of the corresponding pad being incorporated into the back of said touch pad, the supplies for the other equipment passing into the reinforcement bars of the caisson;
  the electronic assembly, connected electronically to the touch pad, ensuring at least the provision of command and control signals of the pad and the data to be displayed on the screen of the pad, said electronic assembly comprising a network connection configured to receive the data to be displayed on the screen and program updates;
  a conversion card for control signals of the touch pad, connected to the touch pad, being connected to an electric generator and also connected to and controlled by the electronic assembly, being configured to ensure the conversion of control signals originating from the electronic assembly, into video signals for the screen of the corresponding touch pad;
  an electronic card configured to control the lighting of the backlighting system, being connected to the electric generator and also connected to and controlled by the electronic assembly; and
  a touch controller connected to the touch pad is connected to the electronic assembly, enabling conversion of the signal, generated by the pad after the screen has been touched, into an electric signal which can be interpreted by the electronic assembly; and
  complementary equipment including a barcode reader module, a printer, a payment system comprising a bank card reader, a loudspeaker and an input, incorporated into the openings of the door, being controlled by at least one electronic assembly and supplied by the electronic assembly or the electric generator of the corresponding interactive touch system
  wherein
  said electronic assembly, said electronic card of the lighting of the backlighting system, said conversion card of video signals and said touch controller are incorporated into the back of said touch pad and connected by connectors.

16. The control terminal according to claim 15, comprising two interactive touch systems arranged back to back, each pad being controlled by its own electronic assembly, each electronic assembly being connected to a plurality of complementary items of equipment contained in the interactive systems, each element of the terminal also being connected to only a single electronic assembly, the two electronic assemblies of the terminal being independent.

17. The control terminal according to claim 15, wherein the closing system of the caisson is controlled by the electronic card supplied by an autonomous supplementary power supply contained in the terminal.

18. The control terminal according to claim 15, wherein each electronic assembly of the terminal is connected to complementary equipment including a barcode reader module, a printer, and a payment system comprising a bank card reader, a loudspeaker and the input.

19. The control terminal according to claim 17, comprising at least one temperature probe and at least one fan connected on the one hand to the electronic card for closing the caisson and on the other hand to the supplementary supply of the terminal, with powering up of the fan being controlled by the electronic card when the internal temperature of the terminal detected by the temperature sensor exceeds a threshold value recorded in a memory space of the electronic card.

20. A control terminal comprising:
  a caisson comprising at least one door equipped with a closing device, the door further comprising a plurality of openings and pivotably mounted on a frame comprising an X-shaped central reinforcement;
  at least one interactive touch system, each interactive touch system comprising:
  a touch pad, comprising a hard protective surface connected with the touch screen of the touch pad projecting onto the pad and having a thickness adapted to fall into an opening flush with the external surface of the caisson, an electronic assembly of the corresponding pad being incorporated into the back of said touch pad, the supplies for the other equipment passing into the reinforcement bars of the caisson;
  the electronic assembly, electrically connected to the touch pad and configured to transfer at least command and control signals of the touch pad and data to be displayed on the screen of the touch pad, said electronic assembly comprising a network connection configured to receive the data to be displayed on the screen and program updates;

a conversion card for control signals of the touch pad, connected to the touch pad, being connectable with an electric generator and also connectable with and controllable by the electronic assembly, being configured to ensure the conversion of control signals originating from the electronic assembly, into video signals for the screen of the corresponding touch pad;

an electronic card configured to control the lighting of the backlighting system, being connectable with the electric generator and also connectable with and controllable by the electronic assembly; and a touch controller connected to the touch pad and connected to the electronic assembly, enabling conversion of the signal, generated by the pad after the screen has been touched, into an electric signal which can be interpreted by the electronic assembly; and complementary equipment including at least one of a barcode reader module, a printer, a payment system, the payment system comprising a bank card reader, a loudspeaker and an input, said complementary equipment being connected and controlled by at least one said electronic assembly and supplied by the electronic assembly or said power supply of the corresponding interactive touch system, wherein said electronic assembly, said electronic card, said conversion card and said touch controller are incorporated into the back of said touch pad and connected by connectors, and wherein said interactive touch system and said complementary equipment are incorporated into the openings of the door.

* * * * *